(12) United States Patent
Gao et al.

(10) Patent No.: US 10,360,923 B2
(45) Date of Patent: Jul. 23, 2019

(54) METHOD AND SYSTEM FOR ELIMINATING AN ECHO

(71) Applicant: SHENZHEN TCL DIGITAL TECHNOLOGY LTD., Shenzhen, Guangdong (CN)

(72) Inventors: Weibiao Gao, Shenzhen (CN); Shenglin Zhu, Shenzhen (CN)

(73) Assignee: SHENZHEN TCL DIGITAL TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/779,830

(22) PCT Filed: Jun. 3, 2016

(86) PCT No.: PCT/CN2016/084821
§ 371 (c)(1),
(2) Date: May 29, 2018

(87) PCT Pub. No.: WO2017/088443
PCT Pub. Date: Jun. 1, 2017

(65) Prior Publication Data
US 2018/0350384 A1 Dec. 6, 2018

(30) Foreign Application Priority Data
Nov. 27, 2015 (CN) .......................... 2015 1 0870000

(51) Int. Cl.
*G10L 21/0232* (2013.01)
*H04R 3/02* (2006.01)
(Continued)

(52) U.S. Cl.
CPC ...... *G10L 21/0232* (2013.01); *G10L 21/0356* (2013.01); *H04M 9/082* (2013.01); *H04R 3/02* (2013.01); *G10L 2021/02082* (2013.01)

(58) Field of Classification Search
CPC . G10L 21/02; G10L 21/0232; G10L 21/0356; G10L 2021/02082; H04M 9/082; H04R 3/02
(Continued)

(56) References Cited

U.S. PATENT DOCUMENTS

| 6,185,300 | B1* | 2/2001 | Romesburg | ........... | H04M 9/082 |
| | | | | | 379/406.09 |
| 2004/0042616 | A1* | 3/2004 | Matsuo | ................. | H04M 9/082 |
| | | | | | 379/406.01 |
| 2012/0287968 | A1 | 11/2012 | Gainey et al. | | |

FOREIGN PATENT DOCUMENTS

| CN | 103077726 | 5/2013 |
| CN | 103152546 | 6/2013 |

(Continued)

OTHER PUBLICATIONS

International search report dated Aug. 24, 2016 from corresponding application No. PCT/CN2016/084821.
(Continued)

*Primary Examiner* — Quynh H Nguyen
(74) *Attorney, Agent, or Firm* — Hauptman Ham, LLP

(57) ABSTRACT

Provided is a method for eliminating an echo. The method includes: obtaining a mixed signal of a mixture of a user's voice given out from the user and the echo given out from a loudspeaker, and obtaining a sound signal given out from the loudspeaker based on the volume of the sound given out from the loudspeaker, the sound signal being used as a reference signal; obtaining a gain coefficient of the reference signal based on comparing the mixed signal with the reference signal, and obtaining a gain signal of the reference signal through the gain coefficient; obtaining a compensation signal of the reference signal based on the gain signal and a corresponding preset compensation coefficient; inverting the compensation signal; and combining the inverted
(Continued)

compensation signal with the mixed signal, so as to eliminate the echo given out from the loudspeaker. A system for eliminating the echo is also provided.

13 Claims, 6 Drawing Sheets

(51) Int. Cl.
    *G10L 21/0356*    (2013.01)
    *H04M 9/08*    (2006.01)
    *G10L 21/0208*    (2013.01)

(58) Field of Classification Search
    USPC .......................................................... 704/226
    See application file for complete search history.

(56) References Cited

FOREIGN PATENT DOCUMENTS

| | | |
|---|---|---|
| CN | 103179295 | 6/2013 |
| CN | 104282314 | 1/2015 |
| CN | 104754157 | 7/2015 |
| CN | 105516859 | 4/2016 |

OTHER PUBLICATIONS

Office Action dated Feb. 26, 2018 from corresponding application No. CN 201510870000.1.

\* cited by examiner

METHOD AND SYSTEM FOR ELIMINATING AN ECHO

RELATED APPLICATIONS

The present application is a National Phase of International Application Number PCT/CN2016/084821, filed Jun. 3, 2016, and claims the priority of China Application No. 201510870000.1, filed Nov. 27, 2015.

FIELD

The present disclosure relates to the field of telecommunication technology, and more particularly to a method and a system for eliminating an echo.

BACKGROUND

In speech recognition systems, especially in long-distance speech recognition systems, such as performing speech recognition on television, because a microphone mounted on the television is closer to a loudspeaker of the television itself, that is, the distance between the microphone and the loudspeaker is closer than that between the microphone and a mouth of a person, and the sound of a program given out from the loudspeaker is generally louder than the sound of the person, so the sound of the television received by the microphone would be louder than the sound received from the person's mouth, that is, to the microphone, the sound of the television (an echo signal) would seriously interfere with the sound of people speaking and seriously affect human speech recognition by the system.

Traditionally, the television output audio signal is obtained to proceed offsetting with the television sound signal received by the microphone, so as to achieve the effect of eliminating television echo. However, due to the unevenness of frequency response and the orientation of the loudspeaker itself, and through the reflection and diffraction of the room and various objects, the echo signal picked up by the microphone and the sound signal obtained from the driving loudspeaker have been already relatively different (the difference in the degree of the attenuation or superposition of each frequency band, being reflected as further changes in the frequency response), therefore the effect of this echo eliminating is relatively limited.

SUMMARY

The present disclosure is to provide a method and a system for eliminating an echo which aims to improve the effect of eliminating the echo.

In order to achieve the above aim, the present disclosure provides a method for eliminating an echo which includes:

obtaining a mixed signal of a mixture of a user's voice given out from the user and the echo given out from a loudspeaker, and obtaining a sound signal given out from the loudspeaker based on the volume of the sound given out from the loudspeaker, the sound signal being used as a reference signal;

obtaining a gain coefficient of the reference signal based on the amplitudes of the mixed signal and the reference signal;

obtaining a gain signal of the reference signal through multiplying the amplitude of the reference signal by the gain coefficient;

obtaining a compensation signal of the reference signal based on the gain signal and a corresponding preset compensation coefficient;

inverting the compensation signal;

synchronizing the time of the mixed signal and the compensation signal based on a time delay of the reference signal; and combining the inverted compensation signal with the mixed signal, so as to eliminate the echo given out from the loudspeaker;

wherein the block "obtaining a mixed signal of a mixture of a user's voice given out from the user and the echo given out from a loudspeaker, and obtaining a sound signal given out from the loudspeaker based on the volume of the sound given out from the loudspeaker, the sound signal being used as a reference signal" including:

recording the time of obtaining the mixed signal and the reference signal;

obtaining the time delay of the reference signal based on the time of obtaining the mixed signal and the reference signal;

calculating the amplitudes of the mixed signal and the reference signal.

Optionally, the block "calculating the amplitudes of the mixed signal and the reference signal" includes:

performing a preset number of samplings to the mixed signal and the reference signal in a preset period to obtain a preset number of sampling signals respectively; and calculating respectively through a preset algorithm based on the sampling signals of the mixed signal and the reference signal, so as to obtain root mean square values of the sampling signals as the amplitudes of the mixed signal and the reference signal.

Optionally, the block "obtaining a compensation signal of the reference signal based on the gain signal and a corresponding preset compensation coefficient" includes:

selecting a preset number of frequencies in preset frequencies to make sounds through the loudspeaker at a preset amplitude;

receiving the echo signals corresponding to the sounds;

obtaining the amplitudes of the echo signals; and calculating to obtain the preset compensation coefficients based on the amplitudes of the echo signals and the preset amplitude.

In addition, in order to achieve the above aim, the present disclosure also provides a method for eliminating an echo which includes:

obtaining a mixed signal of a mixture of a user's voice given out from the user and the echo given out from a loudspeaker, and obtaining a sound signal given out from the loudspeaker based on the volume of the sound given out from the loudspeaker, the sound signal being used as a reference signal;

comparing the mixed signal with the reference signal to obtain a gain coefficient of the reference signal, and obtaining a gain signal of the reference signal through the gain coefficient;

obtaining a compensation signal of the reference signal based on the gain signal and a corresponding preset compensation coefficient;

inverting the compensation signal; and combining the inverted compensation signal with the mixed signal, so as to eliminate the echo given out from the loudspeaker.

Optionally, the block "comparing the mixed signal with the reference signal to obtain a gain coefficient of the reference signal, and obtaining a gain signal of the reference signal through the gain coefficient" includes:

calculating the amplitudes of the mixed signal and the reference signal;

obtaining the gain coefficient of the reference signal based on the amplitudes of the mixed signal and the reference signal; and obtaining the gain signal of the reference signal through multiplying the amplitude of the reference signal by the gain coefficient.

Optionally, the block "calculating the amplitudes of the mixed signal and the reference signal" includes:

performing a preset number of samplings to the mixed signal and the reference signal in a preset period to obtain a preset number of sampling signals respectively; and calculating respectively through a preset algorithm based on the sampling signals of the mixed signal and the reference signal, so as to obtain root mean square values of the sampling signals as the amplitudes of the mixed signal and the reference signal.

Optionally, the block "obtaining a compensation signal of the reference signal based on the gain signal and a corresponding preset compensation coefficient" includes:

selecting a preset number of frequencies in preset frequencies to make sounds through the loudspeaker at a preset amplitude;

receiving the echo signals corresponding to the sounds;

obtaining the amplitudes of the echo signals; and calculating to obtain the preset compensation coefficients based on the amplitudes of the echo signals and the preset amplitude.

Optionally, the block "obtaining a mixed signal of a mixture of a user's voice given out from the user and the echo given out from a loudspeaker, and obtaining a sound signal given out from the loudspeaker based on the volume of the sound given out from the loudspeaker, the sound signal being used as a reference signal" includes:

recording the time of obtaining the mixed signal and the reference signal;

obtaining a time delay of the reference signal based on the time of obtaining the mixed signal and the reference signal;

wherein prior to the block "combining the inverted compensation signal with the mixed signal, so as to eliminate the echo given out from the loudspeaker" includes:

synchronizing the time of the mixed signal and the compensation signal based on the time delay of the reference signal.

In addition, in order to achieve the above aim, the present disclosure also provides a system for eliminating an echo which includes:

a first obtaining module, configured to obtain a mixed signal of a mixture of a user's voice given out from the user and the echo given out from a loudspeaker, and to obtain a sound signal given out from the loudspeaker based on the volume of the sound given out from the loudspeaker, the sound signal being used as a reference signal;

a second obtaining module, configured to obtain a gain coefficient of the reference signal based on comparing the mixed signal with the reference signal, and to obtain a gain signal of the reference signal through the gain coefficient;

a third obtaining module, configured to obtain a compensation signal of the reference signal based on the gain signal and a corresponding preset compensation coefficient;

an inverting module, configured to invert the compensation signal; and a combining module, configured to combine the inverted compensation signal with the mixed signal, so as to eliminate the echo given out from the loudspeaker.

Optionally, the second obtaining module includes:

a calculating unit, configured to calculate the amplitudes of the mixed signal and the reference signal;

a first obtaining unit, configured to obtain the gain coefficient of the reference signal based on the amplitudes of the mixed signal and the reference signal; and a second obtaining unit, configured to obtain the gain signal of the reference signal through multiplying the amplitude of the reference signal by the gain coefficient.

Optionally, the calculating module includes:

a sampling subunit, configured to perform a preset number of samplings to the mixed signal and the reference signal in a preset period to obtain a preset number of sampling signals respectively; and a calculating subunit, configured to calculate respectively through a preset algorithm based on the sampling signals of the mixed signal and the reference signal, so as to obtain root mean square values of the sampling signals as the amplitudes of the mixed signal and the reference signal.

Optionally, the third obtaining module includes:

a selecting unit, configured to select a preset number of frequencies in preset frequencies to make sounds through the loudspeaker at a preset amplitude;

a receiving unit, configured to receive the echo signals corresponding to the sounds;

an obtaining unit, configured to obtain the amplitudes of the echo signals; and a calculating unit, configured to calculate the preset compensation coefficients based on the amplitudes of the echo signal and the preset amplitude.

Optionally, the first obtaining module includes:

a recording unit, configured to record the time of obtaining the mixed signal and the reference signal;

an obtaining unit, configured to obtain a time delay of the mixed signal based on the time of obtaining the mixed signal and the reference signal;

the system further includes:

a synchronizing module, configured to synchronize the time of the mixed signal and the compensation signal based on the delay of the mixed signal.

In the present disclosure the mixed signal of the mixture of the user's voice given out from the user and the echo given out from the loudspeaker is obtained, and the sound signal given out from the loudspeaker based on the volume of the sound given out from the loudspeaker is obtained, the sound signal is used as the reference signal; the gain coefficient of the reference signal is obtained based on comparing the mixed signal with the reference signal, and the gain signal of the reference signal is obtained through the gain coefficient; the compensation signal of the reference signal is obtained based on the gain signal and the corresponding preset compensation coefficient; the compensation signal is inverted; and the inverted compensation signal is combined with the mixed signal, so as to eliminate the echo given out from the loudspeaker. Through the above method, the present disclosure first obtains the gain signal of the reference signal based on the mixed signal, then compensates the gain signal to obtain the compensation signal, and converts the reference signal into the same signal with the echo given out from the actual loudspeaker, then inverts the compensation signal and combines with the mixed signal in order to eliminate the echo in the mixed signal, the elimination of the echo in the mixed signal can be improved, even the echo in the mixed signal is completely eliminated.

DESCRIPTION OF REFERENCE NUMERALS APPEARING IN THE DRAWINGS

Various implementations, functional features, and advantages of the present disclosure will now be described in further detail with reference to the accompanying drawings and some illustrative embodiments.

DETAILED DESCRIPTION OF THE EMBODIMENTS

It is to be understood that, the specific embodiments described herein portrays merely some illustrative embodiments of the present disclosure, and are not intended to limit the patentable scope of the present disclosure.

The present disclosure provides a method for eliminating an echo.

Figure 1:
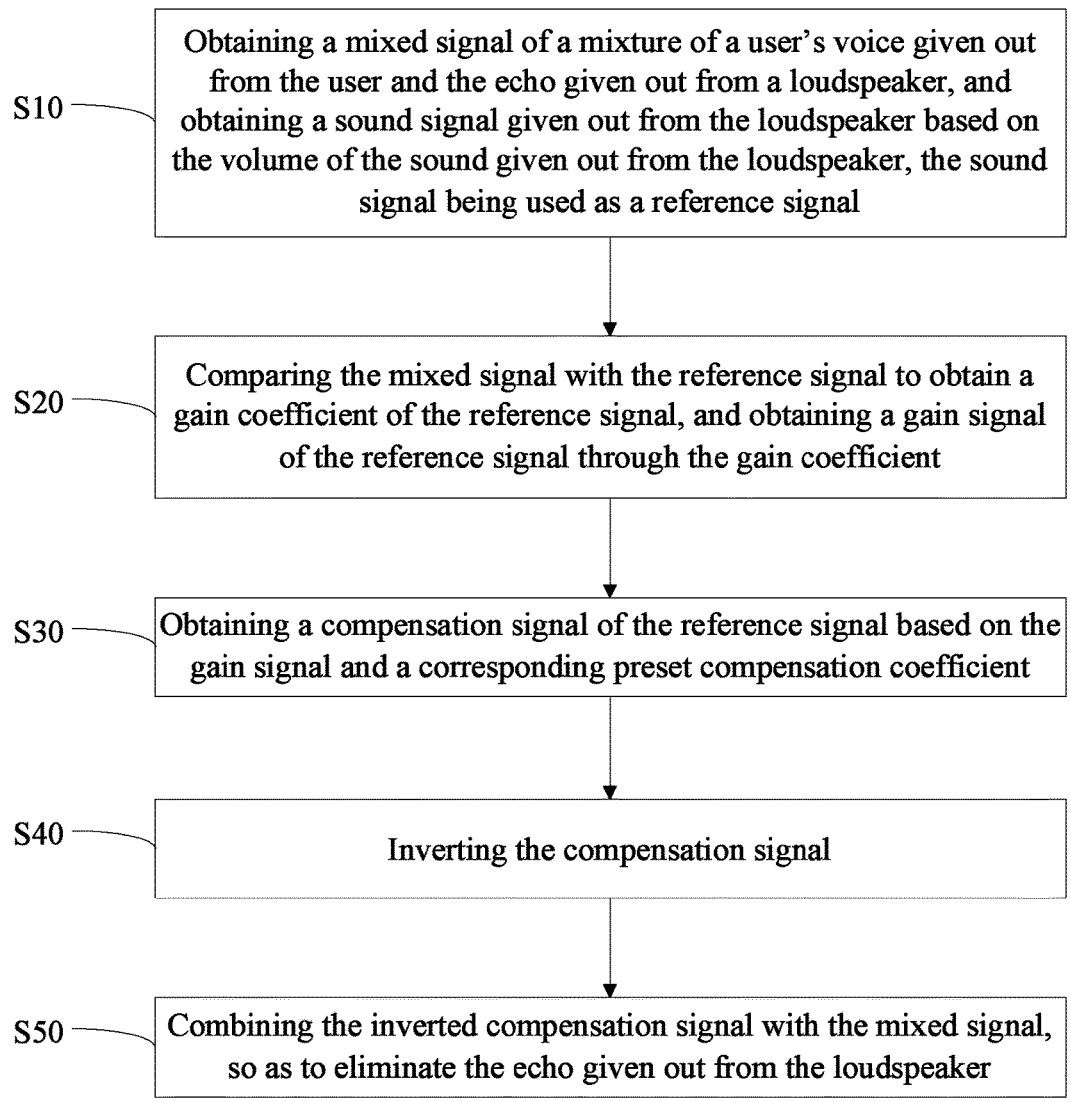
FIG. 1 is a flowchart illustrating a first embodiment of a method for eliminating an echo according to the present disclosure.

Referring to FIG. 1, FIG. 1 is a flowchart illustrating a first embodiment of a method for eliminating an echo according to the present disclosure.

In this embodiment, the method for eliminating the echo includes:

S10, obtaining a mixed signal of a mixture of a user's voice given out from the user and the echo given out from a loudspeaker, and obtaining a sound signal given out from the loudspeaker based on the volume of the sound given out from the loudspeaker, the sound signal being used as a reference signal;

In this embodiment, a television is used as an example for description. In the specific implementation, the present disclosure may also be applied to other occasions where echo elimination is needed according to the core idea of the present disclosure.

In a speech recognition system of the television, the television obtains a user's voice from a user through a microphone while the television may be playing video and/or audio at the same time. The loudspeaker of the television gives out a corresponding sound, the sound given out from the loudspeaker through reflection, diffraction and so on by walls and various objects in the room is reflected to the microphone of the television, and is received by the microphone, the microphone obtains a mixed sound of a mixture of the user's voice given out from the user and the echo given out from the loudspeaker, so as to obtain the mixed signal. Specifically, an analog signal of the mixed signal is obtained, certainly the obtained analog signal may also be converted into a digital signal.

Based on the volume of the sound given out from the loudspeaker, a corresponding sound signal given out from the loudspeaker is simulated according to a preset rule, the sound signal is used as the reference signal, wherein the preset rule refers to the reference signal obtained by a technician according to the volume in an ideal environment, that is, an environment without any reflection or diffraction by various objects.

In the specific implementation, if the present disclosure is applied to other occasions, the mixed signal of a mixture of the user's voice given out from the user and the echo given out from a loudspeaker and the reference signal may be obtained in advance by other means.

S20, comparing the mixed signal with the reference signal to obtain a gain coefficient of the reference signal, and obtaining a gain signal of the reference signal through the gain coefficient;

Due to the difference in power amplifier gain and loudspeaker sensitivity of each TV or other device, the amplitudes of an echo signal picked up by the microphone also vary greatly. The amplitude difference between the reference signal and the echo signal is also very large. To eliminate the difference, the gain coefficient of the reference signal can be obtained via a gain circuit being passed through by the mixed signal obtained in step S10 and the reference signal, the gain circuit of the echo elimination is already widely used, or the gain coefficient of the reference signal is obtained by software, allowing the amplitude of the reference signal is approximately equivalent to the amplitude of the mixed signal, that is, approximately the same.

S30, obtaining a compensation signal of the reference signal based on the gain signal and a corresponding preset compensation coefficient;

Because the sound given out from the loudspeaker passes through different environments, the conditions of the sound passing through various reflection and diffraction varies in different environments, after the sound signal given out from the loudspeaker arrives the microphone, the signal obtained by the microphone has different degrees of enhancement and attenuation in each frequency band, in order to make the gain signal more similar to the echo signal given out from the loudspeaker in the mixed signal, so further processing is required.

The compensation signal of the reference signal is obtained based on the gain signal obtained in step S20 and the corresponding preset compensation coefficient, specifically the compensation signal of the reference signal is obtained by multiplying the gain signal by the corresponding preset compensation coefficient, certainly it is also possible to obtain compensation coefficients of different frequencies according to the gain signal. In the present embodiment, the preset compensation coefficient is obtained by conducting tests of single-frequency positive selection signals of different frequencies preset in the television before the television obtaining the user's voice, certainly it could be a signal of other shapes. Specifically, for example, the television stores n groups of single-frequency positive selection signals with frequencies between 20 Hz and 20 kHz, the amplitude of each is A, a preset number of signals are randomly selected from the n groups of signals before obtaining the user's voice for testing, in this example five groups are selected, the five selected groups of signals are performing test in sequence respectively, the microphone can sequentially obtain five groups of echo signals, and the amplitudes are recorded as A1, A2 . . . A5 respectively, and then the 5 groups of signals are respectively divided by the amplitude A, thus, the compensation coefficients G1-G5 of frequencies of the five groups are obtained. In a specific implementation, the testing could also performed by put different television sizes in different environments, based on the testing results, the average compensation coefficients under different television sizes are obtained and preset in the television. Those skilled in the art could understand that when obtaining the compensation coefficient, the more frequencies are used for testing, the more compensation coefficients of different frequencies are obtained, and the finer when adjusting the gain signal, the better the final effect is.

Through testing, the relationship of the number of signal groups and the similarity between the reference signal after adjustment and the actual echo signal obtained by the loudspeaker obtained by the microphone is shown in the following table, the similarity is identified by an approximate quality number Q. According to the data in the table below, it can be seen that when 10 groups of preset signals with different frequencies are used for testing, the ideal state can be reached by compensation. In a specific implementation, a signal with a preset number of groups may also be used for testing to obtain the compensation coefficient.

| Groups of Signal | Q |
|---|---|
| 5 | 3 |
| 6 | 3.5 |
| 7 | 4 |
| 8 | 4.5 |
| 9 | 5 |
| 10 | 6 |

S40, inverting the compensation signal; and

S50, combining the inverted compensation signal with the mixed signal, so as to eliminate the echo given out from the loudspeaker.

An inverted compensation signal is obtained by inverting the compensation signal obtained in S30, and then the inverted compensation signal is combined with the mixed signal, according to the principle of superposition of two waveforms, the inverted compensation signal similar to the echo given out from the loudspeaker can offset the echo given out from the loudspeaker, so as to eliminate the echo given out from the loudspeaker. In specific implementations, operations such as filtering may also be performed to obtain a more pure user voice.

Further, the mixed signal eliminated the echo is recognized, and corresponding processing is performed.

After eliminating the echo given from the loudspeaker, the pure voice of the user can be sent to the cloud or recognized locally to obtain a corresponding control instruction, the television performs a corresponding processing according to the control instruction, or performs other operations, such as searching through network.

In the present disclosure the mixed signal of a mixture of the user's voice given out from the user and the echo given out from the loudspeaker is obtained, and the sound signal given out from the loudspeaker is obtained based on the volume of the sound given out from the loudspeaker, the sound signal is used as the reference signal; the gain coefficient of the reference signal is obtained based on comparing the mixed signal with the reference signal, and the gain signal of the reference signal is obtained through the gain coefficient; the compensation signal of the reference signal based on the gain signal and the corresponding preset compensation coefficient is obtained; the compensation signal is inverted; and the inverted compensation signal is combined with the mixed signal, so as to eliminate the echo given out from the loudspeaker. Through the above method, the present disclosure first obtains the gain signal of the reference signal based on the mixed signal, then compensates the gain signal to obtain the compensation signal, and converts the reference signal into the same signal with the echo given out from the actual loudspeaker, then inverts the compensation signal and combines with the mixed signal in order to eliminate the echo in the mixed signal, the elimination of the echo in the mixed signal can be improved, even the echo in the mixed signal is completely eliminated.

Figure 2:
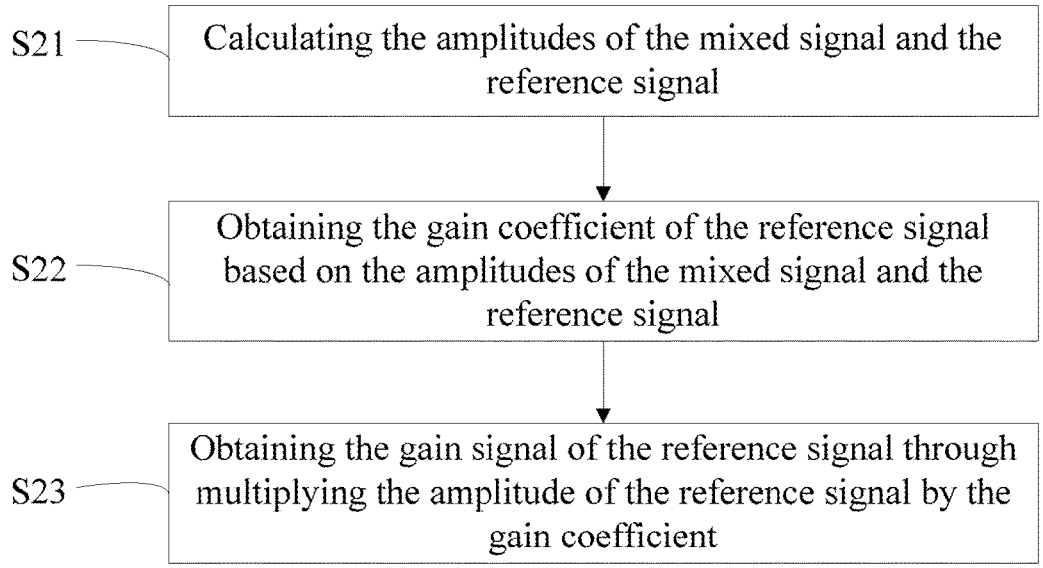
FIG. 2 is a flowchart illustrating an embodiment of obtaining a gain signal of the reference signal based on the mixed signal and the reference signal according to the present disclosure.

Referring to FIG. 2, FIG. 2 is a flowchart illustrating an embodiment of obtaining a gain signal of the reference signal based on the mixed signal and the reference signal according to the present disclosure.

Based on the first embodiment of the method for eliminating the echo in the present disclosure, S20 includes:

S21, calculating the amplitudes of the mixed signal and the reference signal;

S22, obtaining the gain coefficient of the reference signal based on the amplitudes of the mixed signal and the reference signal; and S23, obtaining the gain signal of the reference signal through multiplying the amplitude of the reference signal by the gain coefficient.

In this embodiment, in order to reduce the redundancy of the circuit configuration on the television, the reference signal is processed in a software way. When the mixed signal and the reference signal are obtained, the calculation is performed based on the mixed signal and the reference signal to obtain the amplitudes of the mixed signal and the reference signal respectively, and then the gain coefficient of the reference signal is obtained based on the amplitudes of the mixed signal and the reference signal, specifically, the amplitude of the mixed signal is divided by the amplitude of the reference signal to obtain the ratio of the amplitudes of the mixed signal and the reference signal, i.e. to obtain the gain coefficient of the reference signal, and then the amplitude of the reference signal is multiplied by the gain coefficient, thereby to obtain the gain signal of the reference signal.

Figure 3:
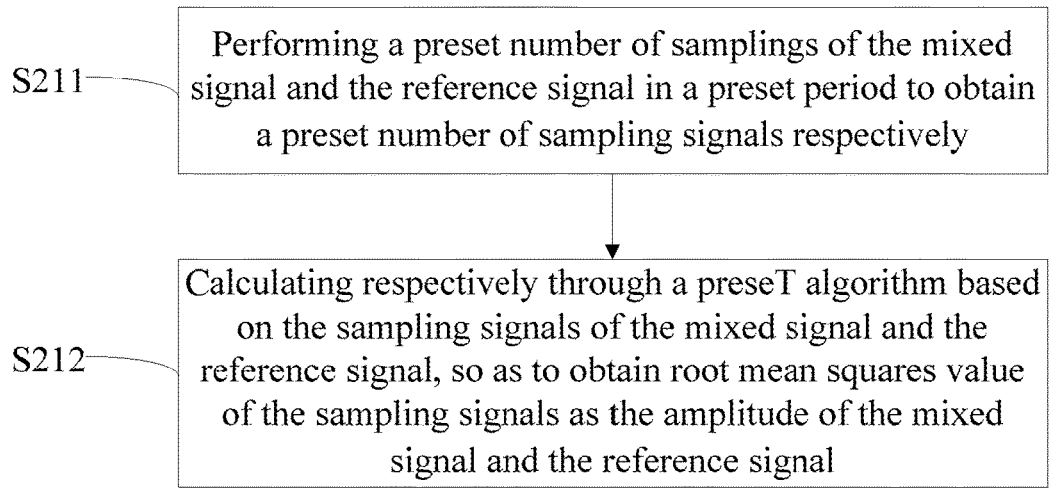
FIG. 3 is a flowchart illustrating an embodiment of the block "calculating the amplitudes of the mixed signal and the reference signal" according to the present disclosure.

Referring to FIG. 3, FIG. 3 is a flowchart illustrating an embodiment of the block "calculating the amplitudes of the mixed signal and the reference signal" according to the present disclosure.

Based on the second embodiment of the method for eliminating the echo in the present disclosure, S21 includes:

S211, performing a preset number of samplings to the mixed signal and the reference signal in a preset period to obtain a preset number of sampling signals respectively;

In order to improve the similarity between the obtained gain signal and the echo given out from the loudspeaker in the mixed signal, in the present disclosure the obtained mixed signal is divided into multi-segment signals, every a preset time is a segment, a preset number of samplings to the mixed signal and the reference signal in a preset period are performed, for example, in a period T=0.2 S, i.e., a sampling period T=0.2 S, in each period samplings with a sampling rate being 48 khz of the mixed signal and the reference signal are performed, then both of the quantities of sampling signals of the mixed signal and the reference signal are obtained respectively, that is 48 khz*0.2=9600.

In a specific implementation, it could only randomly select a signal of the preset period from the mixed signal and the reference signal to perform the preset number of samplings, the obtained signal acts as a sampling signal, such as 5 k samplings in 0.2 s.

S212, calculating respectively through a preset algorithm based on the sampling signals of the mixed signal and the reference signal, so as to obtain root mean squares values of the sampling signals as the amplitudes of the mixed signal and the reference signal.

According to the sampling signals of the mixed signal and the reference signal obtained in S211, calculation is performed through a preset algorithm to obtain the root mean square values of the sampling signals of the mixed signal and the reference signal as the amplitudes of the mixed signal and the reference signal. Wherein the preset algorithm is amplitude $$x = \frac{1}{F*T}\sqrt{\sum_{i=t}^{i=t+T} x_i^2},$$

Wherein F is the quantity of samplings, T is the sampling period, and t is the time of the beginning of a certain period. In a specific implementation, if a signal of a preset time is randomly selected from the mixed signal and the reference signal to perform sampling for a preset number of times, the obtained signal acts as a sampling signal, the preset algorithm is the amplitude $$x - \frac{1}{N}\sqrt{\sum_{i=1}^{i=N} x_i^2},$$

Wherein N is the quantity of samplings.

Figure 4:
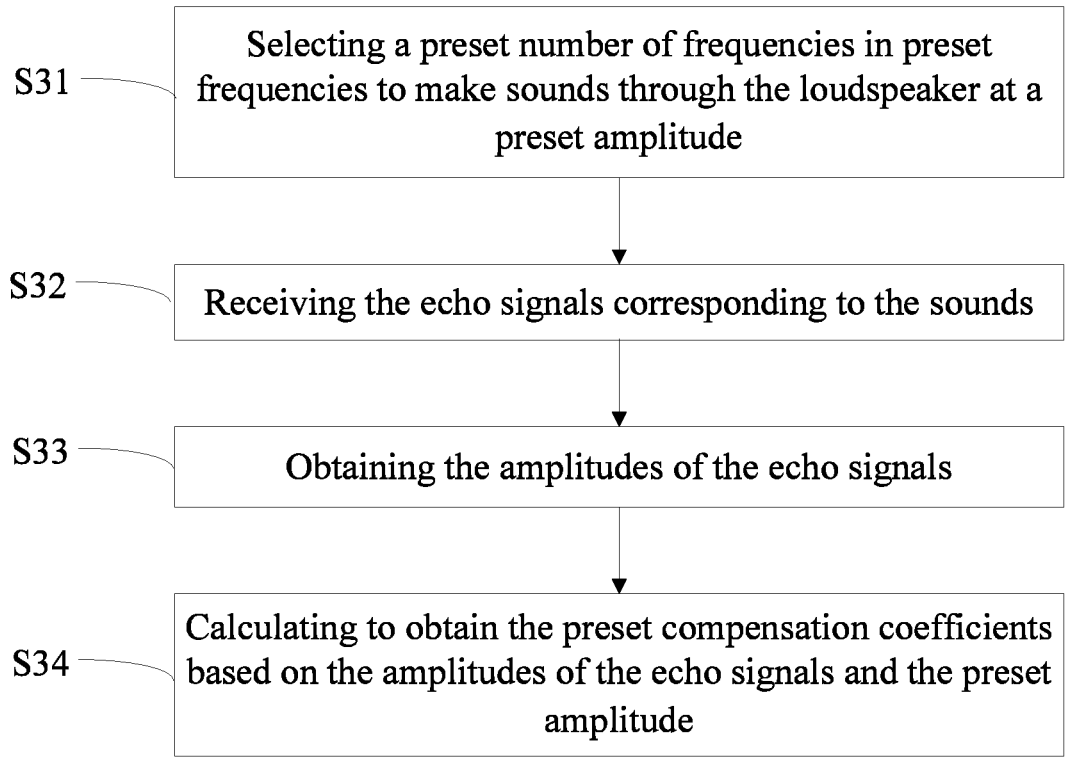
FIG. 4 is a flowchart illustrating an embodiment of the block "obtaining a compensation signal of the reference signal based on the gain signal and a preset compensation coefficient" according to the present disclosure.

Referring to FIG. 4, FIG. 4 is a flowchart illustrating an embodiment of the block "obtaining a compensation signal of the reference signal based on the gain signal and a preset compensation coefficient" according to the present disclosure.

Based on the first embodiment of the method for eliminating the echo in the present disclosure, S30 includes:

S31, selecting a preset number of frequencies in preset frequencies to make sounds through the loudspeaker at a preset amplitude;

S32, receiving the echo signals corresponding to the sounds;

S33, obtaining the amplitudes of the echo signals; and

S34, calculating to obtain the preset compensation coefficients based on the amplitudes of the echo signals and the preset amplitude.

In this embodiment, in order to avoid in reality that various objects in the room may be moved, resulting in the compensation coefficient obtained in advance being different from the actual situation, when the gain signal is obtained in S20, the preset number of frequencies are selected from the preset signals of various frequencies in the television, testing is conducted with a specific preset amplitude, sounds of various frequencies are sequentially given out through the loudspeaker, the microphone in the television sequentially receives the echo signals corresponding to the sounds of various frequencies, corresponding amplitudes are obtained respectively according to the echo signals, then the preset compensation coefficients are obtained by calculating based on the amplitudes of the echo signals and the preset amplitude. The specific process is the same as that in S30 in the first embodiment, thus would not be repeated here.

Figure 5:
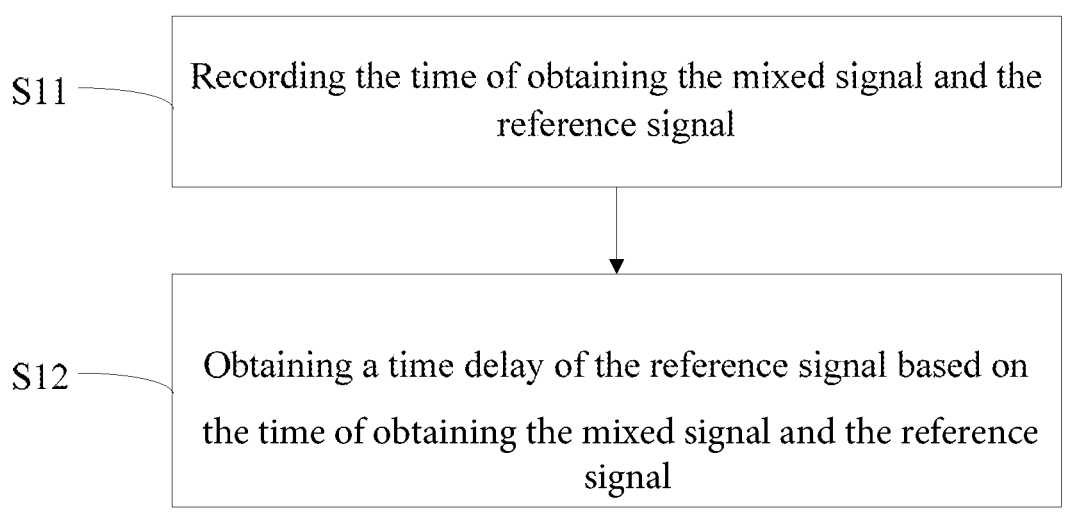
FIG. 5 is a flowchart illustrating an embodiment of obtaining a mixed signal mixed by a user's voice given out from the user and the echo given out from a loudspeaker, and obtaining a reference signal of a sound signal given out from the loudspeaker based on the volume of the sound given out from the loudspeaker according to the present disclosure.

Referring to FIG. 5, FIG. 5 is a flowchart illustrating an embodiment of the block "obtaining a mixed signal of a mixture of a user's voice given out from the user and the echo given out from a loudspeaker, and obtaining a reference signal of a sound signal given out from the loudspeaker based on the volume of the sound given out from the loudspeaker" according to the present disclosure.

Based on the first embodiment of the method for eliminating the echo in the present disclosure, S10 includes:

S11, recording the time of obtaining the mixed signal and the reference signal;

S12, obtaining a time delay of the reference signal based on the time of obtaining the mixed signal and the reference signal;

In practical applications, since the time of the sound given out from the loudspeaker reaching the microphone may be not synchronized with the time of obtaining the reference signal of the sound given out from the loudspeaker based on the volume of the sound given out from the loudspeaker due to the sound given out the loudspeaker passing through reflection and diffraction in the environment, in order to obtain a more ideal final result, the time of the reference signal and the mixed signal need to be synchronized. First, when the mixed signal and the reference signal are obtained, the time of obtaining the mixed signal and the reference signal are recorded at the same time, the time of the reference signal lagging behind the time of the mixed signal is obtained. The time delay of the reference signal is obtained based on the time of obtaining the mixed signal and the reference signal.

Prior to the block "combining the inverted compensation signal with the mixed signal, so as to eliminate the echo given out from the loudspeaker" includes:

Synchronizing the time of the mixed signal and the compensation signal based on the time delay of the reference signal.

In this embodiment, after the time delay of the reference signal is obtained, when the inverted compensation signal is combined with the mixed signal, the time of the mixed signal and the compensation signal is synchronized. In a specific implementation, the time of the mixed signal and the compensation signal may also be synchronized at other times, as long as before the inverted compensation signal combined with the mixed signal.

The present disclosure also provides a system for eliminating the echo.

Figure 6:
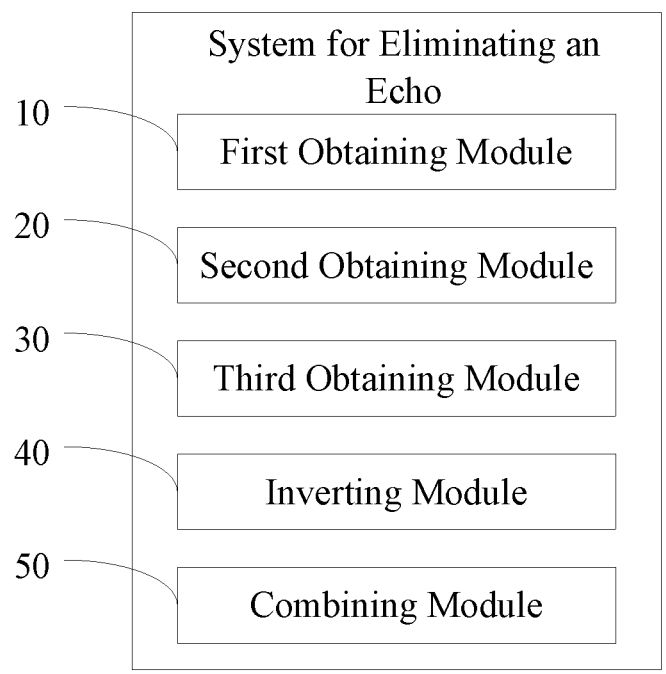
FIG. 6 is a block diagram illustrating a first embodiment of a system for eliminating an echo according to the present disclosure.

Referring to FIG. 6, FIG. 6 is a block diagram illustrating a first embodiment of a system for eliminating an echo according to the present disclosure.

In the present embodiment, the system for eliminating the echo includes:

A first obtaining module 10, configured to obtain a mixed signal of a mixture of a user's voice given out from the user and the echo given out from a loudspeaker, and to obtain a sound signal given out from the loudspeaker based on the volume of the sound given out from the loudspeaker, the sound signal being used as a reference signal.

In this embodiment, a television is used as an example for description. In the specific implementation, the present disclosure may also be applied to other occasions where echo elimination is needed according to the core idea of the present disclosure.

In a speech recognition system of the television, the television obtains a user's voice from a user through a microphone while the television may be playing video and/or audio at the same time. The loudspeaker of the television gives out a corresponding sound, the sound given out from the loudspeaker through reflection, diffraction and so on by walls and various objects in the room is reflected to the microphone of the television, and is received by the microphone, the microphone obtains a mixed sound of a mixture of the user's voice given out from the user and the echo given out from the loudspeaker, so as to obtain the mixed signal. Specifically, an analog signal of the mixed signal is obtained, certainly the obtained analog signal may also be converted into a digital signal.

Based on the volume of the sound given out from the loudspeaker, a corresponding sound signal given out from the loudspeaker is simulated according to a preset rule, the sound signal is used as the reference signal, wherein the preset rule refers to the reference signal obtained by a technician according to the volume in an ideal environment, that is, an environment without any reflection or diffraction by various objects. In the specific implementation, if the present disclosure is applied to other occasions, the mixed signal mixed by the user's voice given out from the user and the echo given out from a loudspeaker and the reference signal may be obtained in advance by other means.

A second obtaining module 20, configured to obtain a gain coefficient of the reference signal based on comparing the mixed signal with the reference signal, and to obtain a gain signal of the reference signal through the gain coefficient.

Due to the difference in power amplifier gain and loudspeaker sensitivity of each TV or other device, the amplitudes of an echo signal picked up by the microphone also vary greatly. The amplitude difference between the reference signal and the echo signal is also very large. To eliminate the difference, the gain coefficient of the reference signal can be obtained via a gain circuit being passed through by the mixed signal obtained in step S10 and the reference signal, the gain circuit of the echo elimination is already widely used, or the gain coefficient of the reference signal is obtained by software, allowing the amplitude of the reference signal is approximately equivalent to the amplitude of the mixed signal, that is, approximately the same.

A third obtaining module 30, configured to obtain a compensation signal of the reference signal based on the gain signal and a corresponding preset compensation coefficient.

Because the sound given out from the loudspeaker passes through different environments, the conditions of the sound passing through various reflection and diffraction varies in different environments, after the sound signal given out from the loudspeaker arrives the microphone, the signal obtained by the microphone has different degrees of enhancement and attenuation in each frequency band, in order to make the gain signal more similar to the echo signal given out from the loudspeaker in the mixed signal, so further processing is required.

The compensation signal of the reference signal is obtained based on the gain signal obtained in step S20 and the corresponding preset compensation coefficient, specifically the compensation signal of the reference signal is obtained by multiplying the gain signal by the corresponding preset compensation coefficient, certainly it is also possible to obtain compensation coefficients of different frequencies according to the gain signal. In the present embodiment, the preset compensation coefficient is obtained by conducting tests of single-frequency positive selection signals of different frequencies preset in the television before the television obtaining the user's voice, certainly it could be a signal of other shapes. Specifically, for example, the television stores n groups of single-frequency positive selection signals with frequencies between 20 Hz and 20 kHz, the amplitude of each is A, a preset number of signals are randomly selected from the n groups of signals before obtaining the user's voice for testing, in this example five groups are selected, the five selected groups of signals are performing test in sequence respectively, the microphone can sequentially obtain five groups of echo signals, and the amplitudes are recorded as A1, A2 . . . A5 respectively, and then the 5 groups of signals are respectively divided by the amplitude A, thus, the compensation coefficients G1-G5 of frequencies of the five groups are obtained. In a specific implementation, the testing could also performed by put different television sizes in different environments, based on the testing results, the average compensation coefficients under different television sizes are obtained and preset in the television. Those skilled in the art could understand that when obtaining the compensation coefficient, the more frequencies are used for testing, the more compensation coefficients of different frequencies are obtained, and the finer when adjusting the gain signal, the better the final effect is. Through testing, the relationship of the number of signal groups and the similarity between the reference signal after adjustment and the actual echo signal obtained by the loudspeaker obtained by the microphone is shown in the following table, the similarity is identified by an approximate quality number Q. According to the data in the table below, it can be seen that when 10 groups of preset signals with different frequencies are used for testing, the ideal state can be reached by compensation. In a specific implementation, a signal with a preset number of groups may also be used for testing to obtain the compensation coefficient.

| Groups of Signal | Q |
| --- | --- |
| 5 | 3 |
| 6 | 3.5 |
| 7 | 4 |
| 8 | 4.5 |
| 9 | 5 |
| 10 | 6 |

An inverting module 40, configured to invert the compensation signal.

A combining module 50, configured to combine the inverted compensation signal with the mixed signal, so as to eliminate the echo given out from the loudspeaker.

An inverted compensation signal is obtained by inverting the compensation signal obtained in S30, and then the inverted compensation signal is combined with the mixed signal, according to the principle of superposition of two waveforms, the inverted compensation signal similar to the echo given out from the loudspeaker can offset the echo given out from the loudspeaker, so as to eliminate the echo given out from the loudspeaker. In specific implementations, operations such as filtering may also be performed to obtain a more pure user voice.

A recognizing module (not shown in the figures), configured for recognizing the mixed signal eliminated the echo, and corresponding processing is performed.

After eliminating the echo given from the loudspeaker, the pure voice of the user can be sent to the cloud or recognized locally to obtain a corresponding control instruction, the television performs a corresponding processing according to the control instruction, or performs other operations, such as searching through network.

In the present disclosure the mixed signal of a mixture of the user's voice given out from the user and the echo given out from the loudspeaker is obtained, and the sound signal given out from the loudspeaker based on the volume of the sound given out from the loudspeaker is obtained, the sound signal is used as the reference signal; the gain coefficient of the reference signal based on comparing the mixed signal with the reference signal is obtained, and the gain signal of the reference signal through the gain coefficient is obtained; the compensation signal of the reference signal based on the gain signal and the corresponding preset compensation coefficient is obtained; the compensation signal is inverted; and the inverted compensation signal is combined with the mixed signal, so as to eliminate the echo given out from the loudspeaker. Through the above method, the present disclosure first obtains the gain signal of the reference signal based on the mixed signal, then compensates the gain signal to obtain the compensation signal, and converts the reference signal into the same signal with the echo given out from the actual loudspeaker, then inverts the compensation signal and combines with the mixed signal in order to eliminate the echo in the mixed signal, the elimination of the echo in the mixed signal can be improved, even the echo in the mixed signal is completely eliminated.

Figure 7:
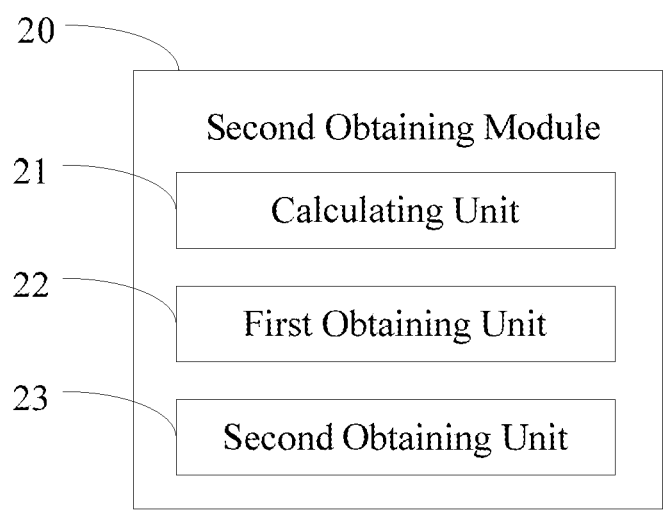
FIG. 7 is a detailed block diagram illustrating an embodiment of a second obtaining module according to the present disclosure.

Referring to FIG. 7, FIG. 7 is a detailed block diagram illustrating an embodiment of a second obtaining module according to the present disclosure.

Based on the first embodiment of the system for eliminating the echo in the present disclosure, the second obtaining module 20 includes:

A calculating unit 21, configured to calculate the amplitudes of the mixed signal and the reference signal.

A first obtaining unit 22, configured to obtain the gain coefficient of the reference signal based on the amplitudes of the mixed signal and the reference signal.

A second obtaining unit 23, configured to obtain the gain signal of the reference signal through multiplying the amplitude of the reference signal by the gain coefficient.

In this embodiment, in order to reduce the redundancy of the circuit configuration on the television, the reference signal is processed in a software way. When the mixed signal and the reference signal are obtained, the calculation is performed based on the mixed signal and the reference signal to obtain the amplitudes of the mixed signal and the reference signal respectively, and then the gain coefficient of the reference signal is obtained based on the amplitudes of the mixed signal and the reference signal, specifically, the amplitude of the mixed signal is divided by the amplitude of the reference signal to obtain the ratio of the amplitudes of the mixed signal and the reference signal, i.e. to obtain the gain coefficient of the reference signal, and then the amplitude of the reference signal is multiplied by the gain coefficient, thereby to obtain the gain signal of the reference signal.

Figure 8:
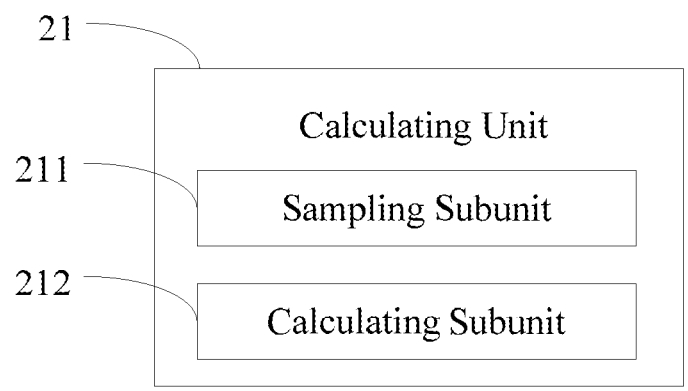
FIG. 8 is a detailed block diagram illustrating an embodiment of a calculating unit according to the present disclosure.

Referring to FIG. 8, FIG. 8 is a detailed block diagram illustrating an embodiment of a calculating unit according to the present disclosure.

Based on the second embodiment of the system for eliminating the echo in the present disclosure, the calculating unit 21 includes:

A sampling subunit 211, configured to perform a preset number of samplings to the mixed signal and the reference signal in a preset time to obtain a preset number of sampling signals respectively.

In order to improve the similarity between the obtained gain signal and the echo given out from the loudspeaker in the mixed signal, in the present disclosure the obtained mixed signal is divided into multiple segments of signals, every a preset time interval is defined as one segment, a preset number of samplings to the mixed signal and the reference signal in a preset time are performed, for example, in a time T=0.2 S, i.e., a sampling period T=0.2 S, in each period samplings with a sampling rate being 48 khz of the mixed signal and the reference signal are performed, then both of the quantities of sampling signals of the mixed signal and the reference signal are obtained respectively, that is 48 khz*0.2=9600.

In a specific implementation, it could only randomly select a signal of the preset time from the mixed signal and the reference signal to perform the preset number of samplings, the obtained signal acts as a sampling signal, such as 5 k samplings in 0.2 s.

A calculating subunit 212, configured to calculate respectively through a preset algorithm based on the sampling signals of the mixed signal and the reference signal, so as to obtain root mean square values of the sampling signals as the amplitudes of the mixed signal and the reference signal.

According to the sampling signals of the mixed signal and the reference signal obtained in S211, calculation is performed through a preset algorithm to obtain the root mean square values of the sampling signals of the mixed signal and the reference signal as the amplitudes of the mixed signal and the reference signal. Wherein the preset algorithm is amplitude $$x = \frac{1}{F*T} \sqrt{\sum_{i=t}^{i=t+T} x_i^2},$$

Wherein F is the quantity of samplings, T is the sampling period, and t is the time of the beginning of a certain period. In a specific implementation, if a signal of a preset time is randomly selected from the mixed signal and the reference signal to perform sampling for a preset number of times, the obtained signal acts as a sampling signal, the preset algorithm is the amplitude $$x = \frac{1}{N} \sqrt{\sum_{i=1}^{i=N} x_i^2},$$

Wherein N is the quantity of samplings.

Figure 9:
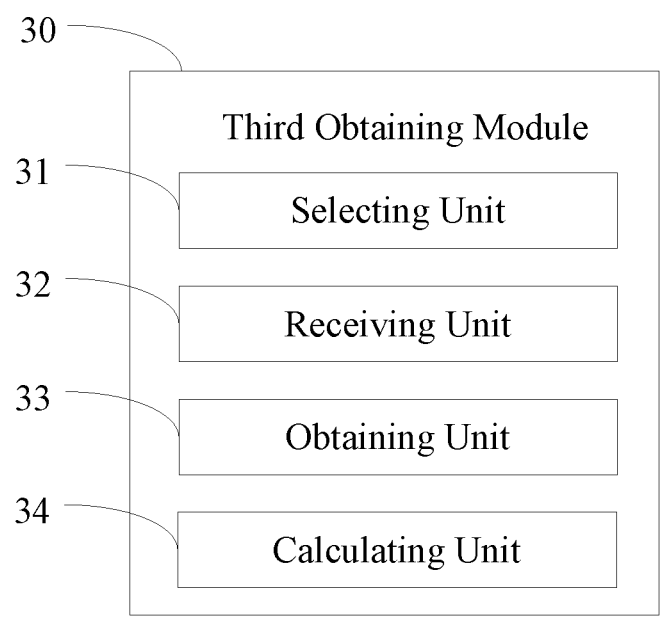
FIG. 9 is a detailed block diagram illustrating an embodiment of a third obtaining module according to the present disclosure.

Referring to FIG. 9, FIG. 9 is a detailed block diagram illustrating an embodiment of a third obtaining module according to the present disclosure.

Based on the first embodiment of the system for eliminating the echo in the present disclosure, the third obtaining module 30 includes:

A selecting unit 31, configured to select a preset number of frequencies in preset frequencies to make sounds through the loudspeaker at a preset amplitude;

A receiving unit 32, configured to receive the echo signals corresponding to the sounds;

An obtaining unit 33, configured to obtain the amplitudes of the echo signals;

A calculating unit 34, configured to calculate the preset compensation coefficients based on the amplitudes of the echo signals and the preset amplitude.

In this embodiment, in order to avoid in reality that various objects in the room may be moved, resulting in the compensation coefficient obtained in advance being different from the actual situation, when the gain signal is obtained in S20, the preset number of frequencies are selected from the preset signals of various frequencies in the television, testing is conducted with a specific preset amplitude, sounds of various frequencies are sequentially given out through the loudspeaker, the microphone in the television sequentially receives the echo signals corresponding to the sounds of various frequencies, corresponding amplitudes are obtained respectively according to the echo signals, then the preset compensation coefficients are obtained by calculating based on the amplitudes of the echo signals and the preset amplitude. The specific process is the same as that in S30 in the first embodiment, thus would not be repeated here.

Figure 10:
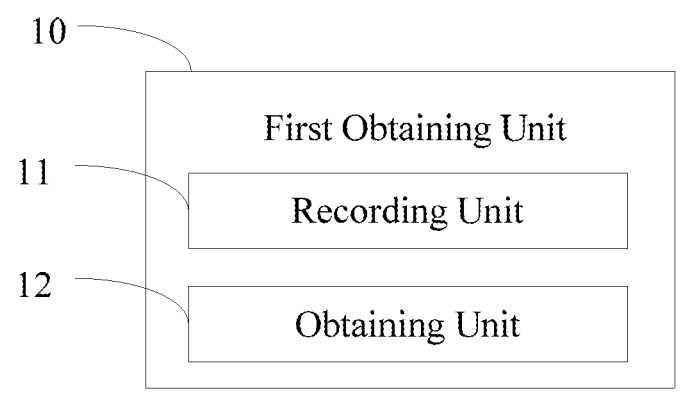
FIG. 10 is a detailed block diagram illustrating an embodiment of a first obtaining module according to the present disclosure.

Referring to FIG. 10, FIG. 10 is a detailed block diagram illustrating an embodiment of a first obtaining module according to the present disclosure.

Based on the first embodiment of the system for eliminating the echo in the present disclosure, the first obtaining module 10 includes:

A recording unit 11, configured to record the time of obtaining the mixed signal and the reference signal;

An obtaining unit 12, configured to obtain a time delay of the mixed signal based on the time of obtaining the mixed signal and the reference signal;

In practical applications, since the time of the sound given out from the loudspeaker reaching the microphone may be not synchronized with the time of obtaining the reference signal of the sound given out from the loudspeaker based on the volume of the sound given out from the loudspeaker due to the sound given out the loudspeaker passing through reflection and diffraction in the environment, in order to obtain a more ideal final result, the time of the reference signal and the mixed signal need to be synchronized. First, when the mixed signal and the reference signal are obtained, the time of obtaining the mixed signal and the reference signal are recorded at the same time, the time of the reference signal lagging behind the time of the mixed signal is obtained. The time delay of the reference signal is obtained based on the time of obtaining the mixed signal and the reference signal.

The system further includes:

A synchronizing module (not shown in the figures), configured to synchronize the time of the mixed signal and the compensation signal based on the time delay of the reference signal.

In this embodiment, after the time delay of the reference signal is obtained, when the inverted compensation signal is combined with the mixed signal, the timing of the mixed signal and the compensation signal is synchronized. In a specific implementation, the timing of the mixed signal and the compensation signal may also be synchronized at other times, as long as before the inverted compensation signal combined with the mixed signal.

The foregoing description portrays merely some illustrative embodiments of the present disclosure, and are not intended to limit the patentable scope of the present disclosure. Any equivalent structural or flow transformations based on the specification and the drawing of the present disclosure, or any direct or indirect applications of the present disclosure in other related technical fields, shall all fall within the protection scope of the present disclosure.

What is claimed is:

1. A method for eliminating an echo, comprising:
    obtaining a mixed signal of a mixture of a user's voice given out from the user and the echo given out from a loudspeaker, and obtaining a sound signal given out from the loudspeaker based on the volume of the sound given out from the loudspeaker, the sound signal being used as a reference signal;
    obtaining a gain coefficient of the reference signal based on the amplitudes of the mixed signal and the reference signal;
    obtaining a gain signal of the reference signal through multiplying the amplitude of the reference signal by the gain coefficient;
    obtaining a compensation signal of the reference signal based on the gain signal and a corresponding preset compensation coefficient;
    inverting the compensation signal;
    synchronizing the time of the mixed signal and the compensation signal based on a time delay of the reference signal; and
    combining the inverted compensation signal with the mixed signal, so as to eliminate the echo given out from the loudspeaker;
    wherein the block "obtaining a mixed signal of a mixture of a user's voice given out from the user and the echo given out from a loudspeaker, and obtaining a sound signal given out from the loudspeaker based on the volume of the sound given out from the loudspeaker, the sound signal being used as a reference signal" comprising:
    recording the time of obtaining the mixed signal and the reference signal;
    obtaining the time delay of the reference signal based on the time of obtaining the mixed signal and the reference signal;
    calculating the amplitudes of the mixed signal and the reference signal.

2. The method of claim 1, wherein the block "calculating the amplitudes of the mixed signal and the reference signal" comprises:
    performing a preset number of samplings to the mixed signal and the reference signal in a preset period to obtain a preset number of sampling signals respectively; and
    calculating respectively through a preset algorithm based on the sampling signals of the mixed signal and the reference signal, so as to obtain root mean square values of the sampling signals as the amplitudes of the mixed signal and the reference signal.

3. The method of claim 1, wherein the block "obtaining a compensation signal of the reference signal based on the gain signal and a corresponding preset compensation coefficient" comprises:

selecting a preset number of frequencies in preset frequencies to make sounds through the loudspeaker at a preset amplitude;
receiving the echo signals corresponding to the sounds;
obtaining the amplitudes of the echo signals; and
calculating to obtain the preset compensation coefficients based on the amplitudes of the echo signals and the preset amplitude.

4. A method for eliminating an echo, comprising:
obtaining a mixed signal of a mixture of a user's voice given out from the user and the echo given out from a loudspeaker, and obtaining a sound signal given out from the loudspeaker based on the volume of the sound given out from the loudspeaker, the sound signal being used as a reference signal;
comparing the mixed signal with the reference signal to obtain a gain coefficient of the reference signal, and obtaining a gain signal of the reference signal through the gain coefficient;
obtaining a compensation signal of the reference signal based on the gain signal and a corresponding preset compensation coefficient;
inverting the compensation signal; and
combining the inverted compensation signal with the mixed signal, so as to eliminate the echo given out from the loudspeaker.

5. The method of claim 4, wherein the block "comparing the mixed signal with the reference signal to obtain a gain coefficient of the reference signal, and obtaining a gain signal of the reference signal through the gain coefficient" comprises:
calculating the amplitudes of the mixed signal and the reference signal;
obtaining the gain coefficient of the reference signal based on the amplitudes of the mixed signal and the reference signal; and
obtaining the gain signal of the reference signal through multiplying the amplitude of the reference signal by the gain coefficient.

6. The method of claim 5, wherein the block "calculating the amplitudes of the mixed signal and the reference signal" comprises:
performing a preset number of samplings of the mixed signal and the reference signal in a preset period to obtain a preset number of sampling signals respectively; and
calculating respectively through a preset algorithm based on the sampling signals of the mixed signal and the reference signal, so as to obtain root mean square values of the sampling signals as the amplitudes of the mixed signal and the reference signal.

7. The method of claim 4, wherein the block "obtaining a compensation signal of the reference signal based on the gain signal and a corresponding preset compensation coefficient" comprises:
selecting a preset number of frequencies in preset frequencies to make sounds through the loudspeaker at a preset amplitude;
receiving the echo signals corresponding to the sounds;
obtaining the amplitudes of the echo signals; and
calculating to obtain the preset compensation coefficients based on the amplitudes of the echo signals and the preset amplitude.

8. The method of claim 4, wherein the block "obtaining a mixed signal of a mixture of a user's voice given out from the user and the echo given out from a loudspeaker, and obtaining a sound signal given out from the loudspeaker based on the volume of the sound given out from the loudspeaker, the sound signal being used as a reference signal" comprises:
recording the time of obtaining the mixed signal and the reference signal;
obtaining a time delay of the reference signal based on the time of obtaining the mixed signal and the reference signal;
wherein prior to the block "combining the inverted compensation signal with the mixed signal, so as to eliminate the echo given out from the loudspeaker" comprises:
synchronizing the time of the mixed signal and the compensation signal based on the time delay of the reference signal.

9. A system for eliminating an echo, comprising one or more processors and a non-transitory program storage medium storing program code executable by the one or more processors, the program code comprising:
a first obtaining module, configured to obtain a mixed signal of a mixture of a user's voice given out from the user and the echo given out from a loudspeaker, and to obtain a sound signal given out from the loudspeaker based on the volume of the sound given out from the loudspeaker, the sound signal being used as a reference signal;
a second obtaining module, configured to obtain a gain coefficient of the reference signal based on comparing the mixed signal with the reference signal, and to obtain a gain signal of the reference signal through the gain coefficient;
a third obtaining module, configured to obtain a compensation signal of the reference signal based on the gain signal and a corresponding preset compensation coefficient;
an inverting module, configured to invert the compensation signal; and
a combining module, configured to combine the inverted compensation signal with the mixed signal, so as to eliminate the echo given out from the loudspeaker.

10. A system of claim 9, wherein the second obtaining module comprises:
a calculating unit, configured to calculate the amplitudes of the mixed signal and the reference signal;
a first obtaining unit, configured to obtain the gain coefficient of the reference signal based on the amplitudes of the mixed signal and the reference signal; and
a second obtaining unit, configured to obtain the gain signal of the reference signal through multiplying the amplitude of the reference signal by the gain coefficient.

11. A system of claim 10, wherein the calculating module comprises:
a sampling subunit, configured to perform a preset number of samplings to the mixed signal and the reference signal in a preset period to obtain a preset number of sampling signals respectively; and
a calculating subunit, configured to calculate respectively through a preset algorithm based on the sampling signals of the mixed signal and the reference signal, so as to obtain root mean square values of the sampling signals as the amplitudes of the mixed signal and the reference signal.

12. A system of claim 9, wherein the third obtaining module comprises:

a selecting unit, configured to select a preset number of frequencies in preset frequencies to make sounds through the loudspeaker at a preset amplitude;

a receiving unit, configured to receive the echo signals corresponding to the sounds;

an obtaining unit, configured to obtain the amplitudes of the echo signals; and a calculating unit, configured to calculate the preset compensation coefficients based on the amplitudes of the echo signal and the preset amplitude.

13. A system of claim 9, wherein the first obtaining module comprises:

a recording unit, configured to record the time of obtaining the mixed signal and the reference signal;

an obtaining unit, configured to obtain a time delay of the mixed signal based on the time of obtaining the mixed signal and the reference signal;

the program code further comprises:

a synchronizing module, configured to synchronize the time of the mixed signal and the compensation signal based on the delay of the mixed signal.

* * * * *